United States Patent [19]

Makino

[11] Patent Number: 4,905,360

[45] Date of Patent: Mar. 6, 1990

[54] APPARATUS FOR FORMING VEHICLE SEAT

[75] Inventor: Hiroyuki Makino, Akishima, Japan

[73] Assignee: Tachi-S Co., Ltd., Tokyo, Japan

[21] Appl. No.: 304,714

[22] Filed: Feb. 1, 1989

[51] Int. Cl.⁴ .............................................. B68G 7/00
[52] U.S. Cl. ..................................... 29/91.5; 29/91.7;
  29/711; 29/718; 29/796
[58] Field of Search ...................... 29/91.1, 91.2, 91.5,
  29/91.7, 700, 708, 711, 718, 796, 458, 459;
  297/452, DIG. 1

[56] References Cited

U.S. PATENT DOCUMENTS

| | | | |
|---|---|---|---|
| 1,801,029 | 4/1931 | Vandervoort | 29/91.7 |
| 3,068,138 | 12/1962 | Friedman | 297/DIG. 1 X |
| 3,146,143 | 8/1964 | Bolesky et al. | 297/DIG. 1 X |
| 3,713,697 | 1/1973 | Koepke | 297/458 X |
| 4,385,427 | 5/1983 | Fraiser | 29/91.5 |
| 4,557,522 | 12/1985 | Isikawa | 297/452 |
| 4,675,962 | 6/1987 | Tillner et al. | 29/91.1 |
| 4,818,331 | 4/1989 | Shimada | 29/91.8 X |

Primary Examiner—Timothy V. Eley
Assistant Examiner—Frances Chin
Attorney, Agent, or Firm—Browdy & Neimark

[57] ABSTRACT

An apparatus for forming a vehicle seat, in which two different upper dies are provided above a base table and two different lower dies are movably provided on the base table. At the central part of the base table, there are a pressing means and a rotary means which cause the pressing of one of the two upper dies against one of the two lower dies. Using this apparatus, two different covering members and cushion members are bonded together in good sequence without need for replacement of the dies so as to produce a number of different seats or seat elements.

12 Claims, 4 Drawing Sheets

APPARATUS FOR FORMING VEHICLE SEAT

BACKGROUND OF THE INVENTION

1. Field of the Invention

The present invention relates to an apparatus for forming a vehicle seat, by means of which a covering surface member is bonded to a pre-formed foam cushion member having an outer contour of a seat, so as to provide a seat for vehicles.

2. Description of the Prior Art

Commonly, the manufacture of a seat for use in a vehicle or an automobile has been based on a bonding method by which a covering surface member is bonded to a pre-formed cushion member. It has been well accepted in terms of rapidity and simplicity. For instance, reference is made to FIGS. 1 and 2. A cushion member (9') is a pre-formed foam mass which has been formed by a mold into a predetermined shape of a seat cushion (A) or a seat back (B). In a practical process, an adhesive is applied to the outer surface of the cushion member (9'), while on the other hand, a covering surface member (4') is first prepared with its peripheral lateral part (4a') being provisionally turned reversely as can be seen by the phantom line (in which it is viewed as being turned upwardly). Then, the covering surface member (4') is bonded to the cushion member (9'), after which, the peripheral lateral part (4'a) of the covering surface member (4) is turned back to its original position as shown by the solid line. In this way, a vehicle seat as shown in FIG. 1 is obtained.

There has been known an apparatus for forming a vehicle seat in the above-stated manner, which comprises an upper die and a lower die, the upper die being vertically movable relative to the lower die. Using this apparatus, the cushion member (9') is secured on the upper die and the covering surface member (4') is placed on the lower die. Thus, by lowering the upper die towards the lower die, the cushion member (9'), on an upper surface of which has been applied an adhesive, is pressed against the covering surface member (4') which is at this moment in such a state wherein its peripheral lateral part (4'a) is turned reversely and disposed as if it covered the upper part of the lower die, although not shown but as can be assumed from the phantom line in the FIG. 2, whereby the covering surface member (4') is bonded to the cushion member (9').

However, the apparatus of this kind is only provided with a single set of upper and lower dies adapted for forming either of the seat cushion (A) and seat back (B), and has been found defective in that a plurality of seat cushions and seat backs, for example, are not produced in sequence and the apparatus per se is unsuitable for a rapid mass-production of those two different seat elements. Thus, according to this prior art, there is a troublesome need for replacement of dies for producing each different seat cushion or seat back, or alternatively, it becomes necessary to provide another apparatus for that purpose. Consequently, the prior art apparatus is disadvantageous in terms of working efficiency and costs involved.

SUMMARY OF THE INVENTION

With the above drawbacks in view, it is a purpose of the present invention to provide a novel apparatus for forming a vehicle seat which permits production of plural different kinds of seats at one unit of apparatus without need for replacement of dies or relevant parts and fittings, and further is improved in the rapidity and efficiency of seat forming operation and reduces costs involved.

In order to attain such purpose, in accordance with the present invention, two lower dies are movably mounted on a support base table such that they are moved along the table via a transfer device, while on the other hand, there is provided a pressure bonding device above the central area of the support base table, the pressure bonding device being vertically movable towards and from the table and comprising a rotary mechanism, a support section and rotary upper die section, wherein the upper die section includes two upper dies which are rotated by the rotary mechanism.

In operation, two different covering members are respectively placed on the two lower dies, and two different cushion members are respectively secured on the two upper dies, after which one of the two covering members is transferred to a bonding operation point right under the corresponding one of the two cushion members, and then, by lowering the upper dies, those covering and cushion members are pressed and bonded together. Thereafter, likewise, the other of the covering members is transferred to that bonding operation point while the other of the cushion members is rotatively displaced to the point right above the corresponding covering member, and they are subjected to the same bonding operation.

Accordingly, two different seat elements are produced by one unit of apparatus and a desired great number of them may be produced through the repetition of the foregoing operation stroke. Further, it is appreciated that during bonding operation of one of the covering and cushion members, the other of them can be secured on the corresponding free lower and dies and an adhesive can also be applied thereto, hence contributing greatly to the facilitation of the seat forming operation.

In one aspect of the present invention, the two upper dies are arranged in an L-shaped manner, and a rotation rod is provided within the pressure bonding device in such a manner as to be inclined at 45 degrees relative to a vertical line. The rotation rod is connected with the two upper dies in its diagonal line and is rotated at 180 degrees by the rotary mechanism. Thus, the two upper dies are assuredly positioned in a vertical bonding point and a horizontal non-operative point, respectively, whereupon one of them is ready to be subject to the bonding operation while the other of them faces towards an operator and is ready to receive thereon a cushion member, which permits the operator to assume his or her best working posture and leads to a large improvement in the rapid sequential steps of seat forming operations.

DETAILED DESCRIPTION OF PREFERRED EMBODIMENTS OF THE INVENTION

Figure 3:
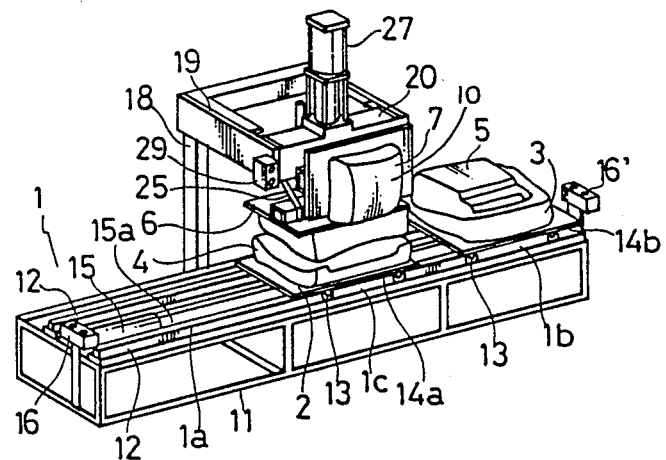
FIG. 3 is a perspective view of an apparatus for forming a seat, of the present invention.

Referring to FIG. 3, an apparatus for forming a vehicle seat in accordance with the present invention is illustrated.

In the apparatus shown, there is provided a support base table at the designation of (1), upon which defined are a first working area (1a) and a second working area (1b) in a right-and-left symmetrical fashion relative to the center of the table (1), and a bonding operation area (1c) is further defined at the center of the table (1).

A pair of spaced-apart rails (12)(12) are mounted fast on the upper surface of the support base table (1) such that they extend in the longitudinal direction of the table (1).

A first lower die (2) and a second lower die (3) are each mounted on those rails (12)(12) in such a manner as to be movable thereon via a plurality of wheels (13) provided rotatably under the two lower dies (2)(3), whereby both lower dies (2)(3) are respectively transferable from their home position to the bonding operation area (1c) for operation purposes to be described later. In the illustrated embodiment, the first lower die (2) has a die surface corresponding in shape to the outer contour of a seat cushion (A) (See FIG. 1) and is so adapted that a covering surface member (4) associated with the seat cushion (A) (which will be referred to as "seat-cushion covering member" hereinafter) is to be placed upon that first lower die (2). The second lower die (3) likewise has a die surface corresponding in shape to the outer contour of a seat back (B) (See FIG. 1) and is so adapted that another covering surface member (4) associated with the seat back (B) (which will be referred to as "seat-back covering member" hereinafter) is to be placed upon that second lower die (3).

The support base table (1) is formed with a support framework (11) thereunder, and as described above, the pair of rails (12)(12) extends on the base table (1). The first and second lower dies (2)(3) are respectively formed with base plates (14a) (14b), such that the two lower dies (2)(3) per se are disposed on their respective base plates (14a) (14b) while the plural wheels (13) are disposed under each of the base plates (14a)(14b), whereby as stated above, the first and second lower dies (2)(3) are movable along the longitudinal direction of the rails (12)(12). As understandable from FIGS. 3, 5 and 6, the base plate (14a) of the first lower die (2) is at its rear side connected with rod (15a) of a horizontal cylinder (15) firmly, and although not shown, the other base plate (14b) of the second lower die (2) is at its rear side firmly connected with the rod of a similar horizontal cylinder. Here, it should be understood that the latter cylinder and its rod will be given the designations: (15')(15'a), respectively, hereinafter. Both horizontal cylinders (15)(15') as well as their respective rods (15a)(15'a) are mounted on the base table (1) that they extend in between the pair of rails (12)(12) in parallel therewith and that their rods (15a)(15'a) are disposed in a mutually faced relation with a certain distance therebetween. Further, a switch (16) at the first working area (1a) is electrically connected with the horizontal cylinder (15) at the same area, and a switch (16') at the second working area (1b) is likewise connected with the other horizontal cylinder (15'), so that the operation of the former switch (16) actuates the cylinder (15) to extend or withdraw its rod (15a), thereby causing the first lower die (2) to move on the rails (12)(12) towards and away from the bonding operation area (1c), while similarly, operating the latter switch (16') actuates the cylinder (15') to extend or withdraw its rod (15'a), causing the movement of the second lower die (3) towards and away from the bonding operation area (1c).

Figure 4:
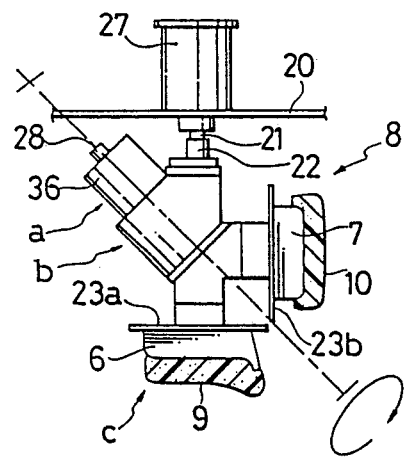
FIG. 4 is a partly sectional side view of a pressure bonding device of the apparatus in the FIG. 3 which shows the paddings to be secured on the dies.
Figure 7:
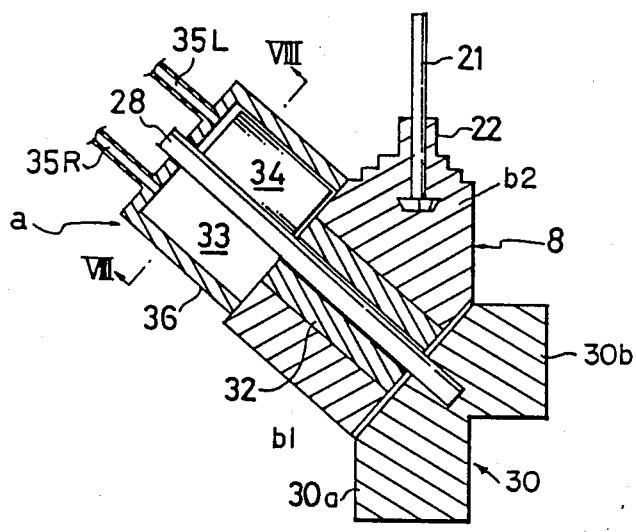
FIG. 7 is a sectional view of the pressure bonding device.

At the bonding operation area (1c), a pressure bonding device is provided which is generally designated by (8) and disposed above the base table (1). Specifically, a support pillar (18) stands at the bonding operation area (1c) and at the upper end of the support pillar (18), a pair of spaced arms (19)(19) are fixedly provided which extend therefrom above the base table (1) and in a direction transverse to the same table (1) and a support member (20) is provided between the free forward ends of the arms (19)(19). At the support member (20), a vertical cylinder (27) is fixedly mounted such that its piston rod (21) extends downwardly through the support member (20). As seen in FIGS. 4 and 7, the pressure bonding device (8) is integrally connected with the piston rod (21) of the vertical cylinder (27) and dependent therefrom. Numerals (20)(22) denote guide members in which the piston rod (21) passes, whereby the piston rod (21) is supportively guided by those two guide members for vertical movements.

The pressure bonding device (8) is, therefore, disposed between the support arms (19) and the base table (1), and the construction of the pressure bonding device (8) is such that there are defined a rotary mechanism (a), a support section (b) and rotary upper die section (c), as shown. Referring particularly to FIG. 7, a rotation rod (28) extends within the rotary mechanism (a), support sections (b) and rotary upper die section (c), in such a manner that the rotation rod (28) is inclined at the angle of 45 degrees in relation to the vertical axis of the piston rod (21) of the vertical cylinder (27). The rotation rod (28) is associated with the rotary mechanism (a), as will be specified later, and supported rotatably by the bearing (32) provided in the support section (b). The lower end part of the rotation rod (28) is fixedly connected with a bifurcated rotary support member (30) associated with the rotary upper die section (c).

Figure 8:
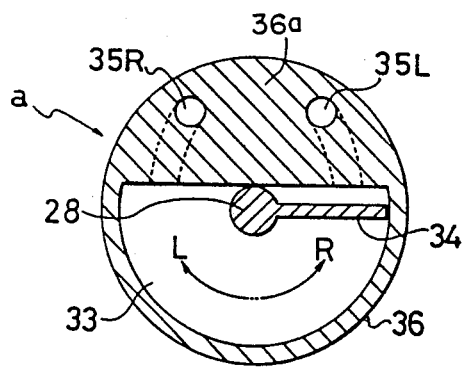
FIG. 8 is a sectional view taken along the line VIII—VIII.

The illustrated rotary mechanism (a), as best shown in FIG. 8, comprises a pneumatic rotary device (36) of a known type, in which a rotary vane (34) of a rectangular shape is fixed on the rotation rod (28) along the axial direction thereof and rotatable with the rotation of the rod (28) about its axis within an air chamber (33) of a semi-circular shape in cross-section, and a pair of air ducts (35R)(35L) are formed in the mass (36a) of semi-circular cross-section in the rotary device (36), the two air ducts (35R)(35L) being defined in a symmetrical, spaced-apart relation with each other, as shown, with respect to the axis of the rotation rod (28). Such rotary mechanism (a) is not limited to the shown pneumatic rotary device (36), but may be constructed by a motor and a suitable reciprocal half-rotary mechanism, or the like.

The support section (b) is so formed that an inclined part (b1) and a vertical part (b2) are defined therein, as shown. The inclined part (b1) is inclined at the angle of 45 degrees relative to the vertical axis of the piston rod

(21) of the vertical cylinder (27), and have the bearing (32) therein. The vertical part (b2) has the guide member (22) formed in its upper end portion, and the piston rod (21) is fixed integrally in the vertical part (b2). Accordingly, the forgoing rotary mechanism (a) is provided upon the upper end of the inclined part (b1) of the support section (b), whereupon the rotary mechanism (a) per se and its rotation rod (28) are both inclined at 45 degrees relative to the piston rod (21).

The rotary upper die section (c) is, as in FIGS. 4 and 7, disposed at the lower end of the inclined part (b1) of the support section (b), and is of such a structure wherein the bifurcated rotary support member (30) is integrally fixed to the lower end portion of the rotation rod (28), the bifurcated rotary support member (30) having two support legs (30a)(30b) which extend apart from each other in an L-shaped manner (i.e. with a right angle provided between the two support legs (30a)(30b)) in reference to the rotation rod (28). A first base plate (23a) is fixedly mounted on the free end of the support legs (30a), whereas a second base plate (23b) is fixedly mounted on the free end of the support legs (30b). As seen in FIG. 4, a first upper die (6) is fixed upon the first base plate (23a). The first upper die (6) is adapted for securing thereon a cushion member (9) associated with the seat-cushion (A) (which will be referred to as "seat-cushion padding" hereinafter). On the other hand, a second upper die (7) is fixed on the second base plate (23b) and adapted for securing thereon a cushion member (10) associated with the seat-back (B) (which will be referred to as "seat-back padding" hereinafter).

It is, here, seen, by referring to FIG. 4, that the rotation rod (28) extends slant along a diagonal line (l) which runs from the right-angle corner (v) defined between those two upper dies (6)(7), and that the first upper die (6) is situated in a horizontal operative position wherein the seat-cushion padding (9) thereon is oriented horizontally towards the base table (1), and, by contrast, the second upper die (7) is situated in a vertical non-operative position wherein its upper surface faces towards an operators' working side opposite to the support pillar (18); that is to say, the seat-back padding (10) is disposed vertically with respect to the base table (1).

It is noted that both seat-cushion and seat-back paddings (9)(10) are made of a foam material and formed in a mold into a predetermined outer configuration of seat-cushion and seat-back, respectively.

As seen from FIG. 3, air suction pipes (25)(25') are respectively connected with the first and second upper dies (6)(7) the air suction pipe 25' being substantially the same as pipe 25 and thus omitted from the drawings for the sake of simplicity. Though not shown in detail, the seat-cushion padding (9) is secured onto the first upper die (6) under the drawing vacuum effect therebetween which is created by air suction of a vacuum source (not shown) connected to the suction pipe (25), wherein, of course, a plurality of holes are formed on the upper die (6) for air communication with the pipe (25). The same goes for the second upper die (7): Briefly, the other air suction pipe (25') (not shown) is connected with the second upper die (7) for the same vacuum securing purpose in order to secure the seat-back padding (10) thereto. The vacuum source is electrically actuated by the switching operation of a switch (29).

It should be noted that both rotary mechanism (a) and vacuum source for the first and second upper dies (6)(7) are electrically connected with the switch (29), and that further the vertical cylinder (27) is electrically connected with the same switch (29). Therefore, those three elements are actuated or stopped by the switching operation of the switch (29).

In this respect, regarding the rotary mechanism (a) or pneumatic rotary device (36), the operation of that switch (29) causes an air supply/suction source (not shown) to supply an air through the air duct (35L) into the air chamber (33) of the device (36), with the result that the rotary vane (34) is caused by the increased volume of the supplied air to rotate in the arrow from the designation (R) towards the one (L) at 180 degrees within the semi-circular cross-sectional space of the air chamber (33). With such rotation of the rotary vane (34), the rotation rod (28) is simultaneously rotated so as to produce the 180-degree revolution of the support legs (30a)(30b) of the rotary upper die section (c) and consequently, the first upper die (6) is rotated around the axis of the rotation rod (28) and displaced from the above-mentioned vertical operative position up to the above-mentioned horizontal non-operative position, while at the same time, the second upper die (7) is likewise rotated around the axis of the rotation rod (28) and reversely displaced from the horizontal non-operative position down to the vertical operative position. At this moment, the supplied air in the air chamber (33) is sucked from the air duct (35R) automatically, thereby expediting the air flow for rotation of the rotary vane (34). Accordingly, when it is desired to displace back the first upper die (6) to the vertical operative position in a practical operation process, then air is supplied from the air duct (35R) into the air chamber (33) and sucked by the air duct (35L) so as to cause the rotation of the rotary vane (34) in the direction from the (L) to the (R).

Now, a description will be made of the operation of the above-described apparatus.

First, by operating the two switches (16)(16'), the first and second lower dies (2)(3) are moved and positioned, respectively, at the first and second working areas (1a)(1b) on the support base table (1), as an initial operation step, and then the seat-cushion and seat-back covering members (4)(5) are placed on the first and second lower dies (2)(3), respectively. Next, the switch (16) is pressed to actuate the horizontal cylinder (15) to cause the first lower die (2) to move and stop at the bonding operation area (1c) right under the pressure bonding device (8).

Figure 6:
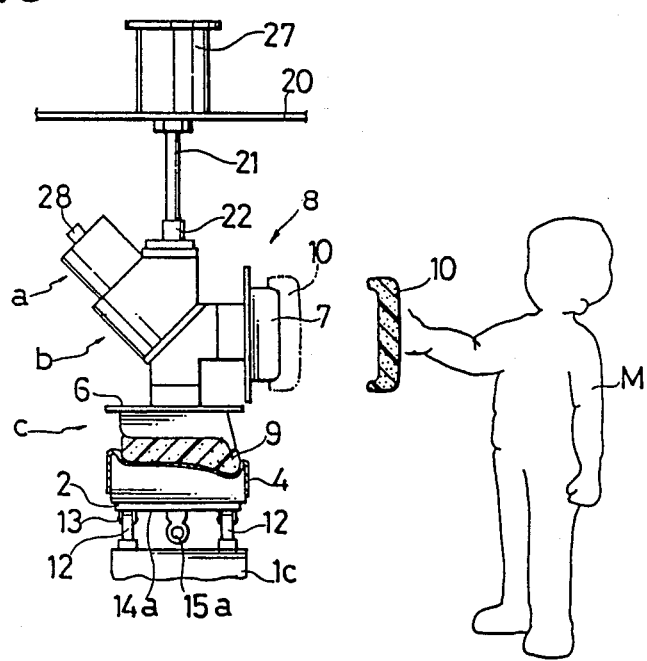
FIG. 6 is a partly sectional side view of the same elements as in the FIG. 5, showing the state wherein a bonding operation is being effected.

After ascertaining that the seat-cushion covering member (4) on the first lower die (2) is situated right under the bonding device (8), the switch (29) is turned on to actuate the pneumatic rotary device (36), which causes the rotation rod (28) to rotate at 180 degrees under its 45-degree inclination angle, whereby the first upper die (6) is displaced rotatively around the axis of the rotation rod (28), as shown by the arrow in FIG. 4, up to the above-stated horizontal non-operative position where, as can be assumed from FIG. 6, the first upper die (6) faces towards an operator (M), implying the readiness for the operator (M) to secure a padding to the die.

Figure 5:
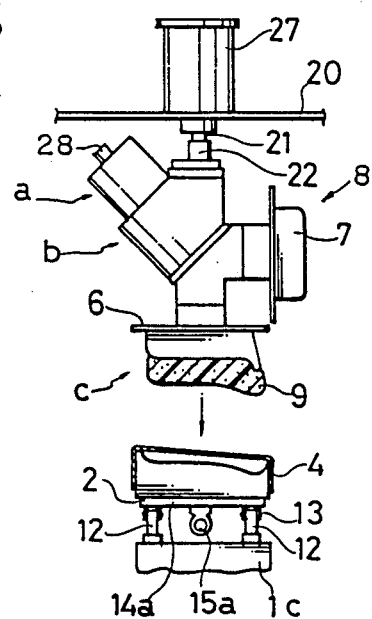
FIG. 5 is a partly sectional side view of the pressure bonding device and lower die.

Then, onto thus-displaced upper die (6), the seat-cushion padding (9) is secured, through the operation of the switch (29), working the vacuum source and vacuum securing effect. Thereafter, an adhesive is applied on the surface of the seat-cushion padding (9), and through the reverse operation of the pneumatic rotary device (36), the first upper die (6) with the seat-cushion padding (9) secured thereon is displaced rotatively back to the vertical operative position, as in FIG. 4, so that the seat-cushion padding (9) is located exactly above the seat-cushion covering member (4), as shown in FIG. 5.

The seat-cushion padding (9) is then lowered towards and pressed against the seat-cushion covering member (4) on the first lower die (2), by the actuation of the vertical cylinder (27) which extends its rod (21) downwardly, thus lowering the first upper die (6) on which the seat-cushion padding (9) is secured.

During such pressure bonding operation of the seat-cushion padding and covering members (9)(4), as illustrated in FIG. 6, the seat-back padding (10) is secured by the operator (M) onto the second upper die (7) which is being situated at the horizontal non-operative position, and then, an adhesive is applied on the surface of the seat-back padding (10).

Figure 1:
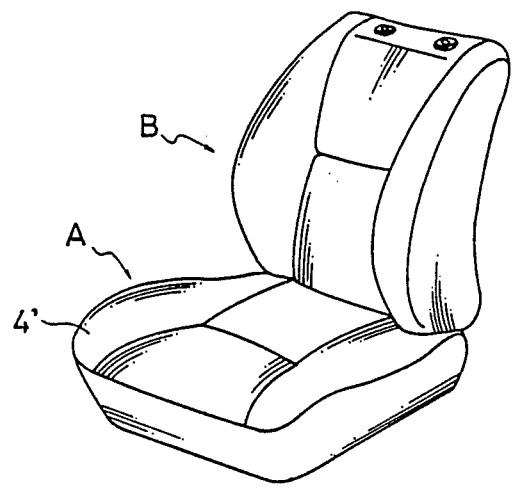
FIG. 1 is a perspective view of a seat to be produced by the present invention.
Figure 2:
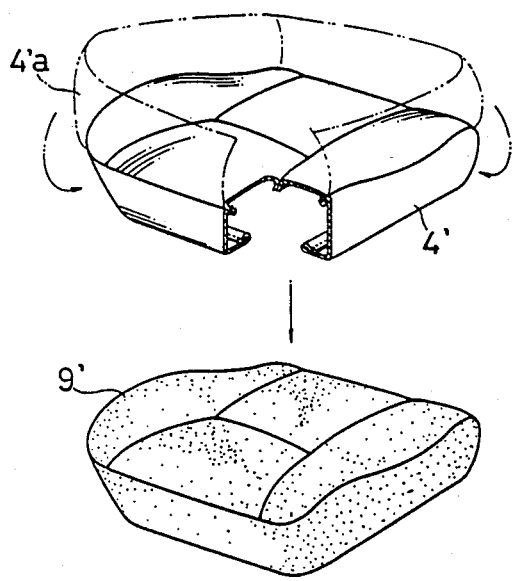
FIG. 2 is a partly broken, exploded perspective view of the seat in the FIG. 1.

At the completion of the foregoing bonding step, a bonded unit of the seat-cushion padding and covering member (9)(4) is left on the lower die (2) by releasing the vacuum securing effect at the upper die (6) and raising the upper die (6). That bonded unit is transferred via the lower die (2) to the first working area (1a) through the actuation of the horizontal cylinder (15) and taken out therefrom. Thus, a seat-cushion as indicated by (A) in FIG. 1 is now produced.

Next, the second lower die (3), on which the seat-back covering member (5) is placed, is transferred to the bonding operation area (1c) by operating the switch (16') for actuation of the horizontal cylinder (15') which moves the second lower die (3). Thereafter, similarly to the above-described operations, the next step is to displace the second upper die (7) to the vertical operative position through the reverse 180-degree rotation of the rotation rod (28) by switching over the switch (25) for reverse action of the pneumatic rotary device (36), so that the seat-back padding (10) is located right above the seat-back covering member (5), and then to lower and press the seat-back padding (10) against the seat-back covering member (5) for bonding them together, by lowering the second upper die (7) though the actuation of the vertical cylinder (27), in the same way as shown in FIG. 5. Of course, during this second bonding operation, another seat-cushion padding is secured on the first upper die (6) and an adhesive is applied on the surface of the seat-cushion padding. After the bonding step, a bonded unit of the seat-back padding and covering member (10)(5) is transferred to the second working area (1b) and taken out therefrom, whereupon a seat-back as indicated by (B) in FIG. 1 is produced.

Repetition of the above-described stroke of seat-back and seat-cushion forming operations are to be effected, whereby a desired great number of seat-cushion and seat back can be produced in sequence without pause or need for replacements of the dies.

While having described the present invention as above, it should however be understood that the invention is not limited to the illustrated embodiments, but any other modifications, replacements and additions may structurally be possible without departing from the spirit and scope of the appended claims for the invention. For example, the dies (2)(3)(6)(7) are not limited for forming seat-cushion and seat-back, but any other various dies may be used in the present invention for forming various kinds of vehicle seats.

From the above descriptions, it is to be appreciated that in accordance with the present invention, the two different upper dies are rotatively displaced to an operative position and a non-operative position and the two different corresponding lower dies are transferable for bonding operation against the respective two upper dies, and that accordingly, there is no need to stop the operation and replace the dies by another dies for producing a seat, which reduces greatly costs involved in the seat assembly. Further, an adhesive application step is simultaneously effected during the seat forming operation, thus expediting the operation and improving the work efficiency. In particular, the two upper dies (6)(7) are arranged in an L-shaped manner as described above, and are to be rotated around the 45-degree inclined rotation rod (28) within the 180-degree rotation range. This structure ensures the placement of one of the upper dies in a position to be readily subjected to the bonding operation and at the same time placement of the other of them in a position facing towards an operator for readily securing of a padding thereto by him or her. Therefore, the operator can assume his or her best working posture with a comfortable feeling. Further the structure is very simple yet most effective in facilitating the flow of the seat forming steps.

What is claimed is:

1. An apparatus for forming a vehicle seat, comprising:

a base table in which a first working area, a second working area and a bonding operation area are defined;

a pair of first and second lower dies which are moveably mounted on said base table, such that said first lower die is normally located at said first working area, whereas said second lower die is normally located at said second working area, wherein upon said first lower die, a first covering member is to be placed and upon said second lower die, a second covering member is to be placed;

a transfer means for transferring said first and second lower dies from their respective first and second working areas towards said bonding operation area on said base table, and for transferring said first and second lower dies from said bonding operation area towards their respective first and second working areas;

a pair of first and second upper dies which are provided at said bonding operation area such that they are rotatable and vertically movable with respect to said base table, wherein said first upper die is adapted for securing thereon a first cushion member cushion member;

a rotary means for causing rotation of said pair of first and second upper dies in order that one of said two upper dies is to be faced towards one of said first and second lower dies, when the latter is transferred to said bonding operation area; and a pressing means for pressing one of said pair of first and second upper dies against said pair of first and second lower dies;

whereby, said first and second covering members are placed on said first and second lower dies, respectively, while said first and second cushion members are secured on said first and second upper dies, respectively, and then, after an adhesive is applied to said first and second cushion members, one of said first and second cushion members is pressed against and bonded to one of said first and second covering members by operation of said transfer means, rotary means and pressing means.

2. The apparatus according to claim 1, wherein said first lower die has a die surface corresponding in shape to an outer contour of a seat-cushion of said seat.

3. The apparatus according to claim 1, wherein said second lower die has a die surface corresponding in shape to an outer contour of a seat-back of said seat.

4. The apparatus according to claim 1, wherein said transfer means comprises a pair of cylinders which are respectively provided at said first and second working areas, and wherein one of said two cylinders is adapted for moving said first lower die from its first working area towards said bonding operation area and from said bonding operation area towards said first working area, whereas the other of said two cylinders is adapted for moving said second lower die from its second working area towards said bonding operation area and from said bonding operation area towards said second working area.

5. The apparatus according to claim 1, wherein said first working area and said second working area are disposed in a symmetrical, spaced-apart relation with each other relative to central part of said base table, and said bonding operation area is disposed at said central part of said base table, wherein said transfer means is provided at each of said first and second working areas, whereby said first and second lower dies are independently moved between their respective first and second working areas and said bonding operation area by means of said transfer means, and wherein said pressing means is provided at said bonding operation area.

6. The apparatus according to claim 1, wherein said pressing means includes a cylinders for vertically moving said pressing means.

7. The apparatus according to claim 1, wherein said pressing means comprises a pressure bonding device and a cylinder for vertically moving said pressure bonding device with respect to said base table, said cylinder having a piston rod which extends vertically and is connected with said pressure bonding device, wherein said pressure bonding device including said rotary means, a support section which is connected with said piston rod of said cylinder, and a rotary upper die section in which said first and second upper dies are provided, and wherein said rotary means includes a rotation rod which is rotatably supported by said support section and connected with said rotary upper die section in such a manner that said rotation rod is inclined at an angle of 45 degrees in relation to a vertical axis of said piston rod of said cylinder.

8. The apparatus according to claim 7, wherein said rotary means is so designed as to cause said rotation rod to rotate at 180 degrees so that one of said first and second upper dies is rotated at 180 degrees to face towards said base table and the other of said first and second upper dies is rotated at 180 degrees to face towards an operator's side where said the other of said first and second upper dies is readily accessible for the operator.

9. The apparatus according to claim 7, wherein said first and second upper dies are so arranged in said rotary upper die section that they are disposed in an L-shaped manner, with a generally right angle being provided therebetween, wherein said rotation rod is connected with thus L-like arranged first and second upper dies such that the former is in a diagonal relation with the latter, and wherein said rotary means is so designed as to cause said rotation rod to rotate at 180 degrees, whereby one of said first and second upper dies is rotated around an axis of said rotation rod and faced vertically towards said base table, while the other of said first and second upper dies is rotated around said axis of said rotation rod and oriented horizontally with respect to said base table.

10. The apparatus according to claim 1, wherein said first and second upper dies are each provided with a vacuum means which serves to draw and secure said first and second cushion member to the respective said first and second upper dies.

11. The apparatus according to claim 1, wherein said first and second covering members are respectively a covering member for a seat-cushion of said seat and a covering member for a seat-back of said seat, and wherein said first and second cushion members are respectively a foam padding for a seat-cushion of said seat and a foam padding for a seat-back.

12. The apparatus according to claim 1, wherein said first and second cushion member are each pre-formed in a mold into a predetermined outer contour of said seat.

* * * * *